United States Patent
Albert et al.

(10) Patent No.: US 10,621,669 B2
(45) Date of Patent: *Apr. 14, 2020

(54) SYSTEMS AND METHODS FOR STATUS DATA GRAPHICAL INTERFACE

(71) Applicant: Hartford Fire Insurance Company, Hartford, CT (US)

(72) Inventors: Victoria F. Albert, Guilford, CT (US); Susmita Shukla, Glastonbury, CT (US)

(73) Assignee: Hartford Fire Insurance Company, Hartford, CT (US)

(*) Notice: Subject to any disclaimer, the term of this patent is extended or adjusted under 35 U.S.C. 154(b) by 322 days.

This patent is subject to a terminal disclaimer.

(21) Appl. No.: 15/625,062

(22) Filed: Jun. 16, 2017

(65) Prior Publication Data

US 2017/0287075 A1   Oct. 5, 2017

Related U.S. Application Data

(63) Continuation of application No. 14/028,187, filed on Sep. 16, 2013, now Pat. No. 9,684,932, which is a continuation of application No. 12/906,708, filed on Oct. 18, 2010, now Pat. No. 8,539,370.

(51) Int. Cl.
*G06F 3/048* (2013.01)
*G06Q 40/06* (2012.01)
*G06Q 10/10* (2012.01)

(52) U.S. Cl.
CPC ............ *G06Q 40/06* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 6,928,625 | B2* | 8/2005 | Makinen | G06F 3/0481 700/110 |
| 7,996,239 | B1* | 8/2011 | Pellican | G06Q 10/10 705/2 |
| 2007/0038484 | A1* | 2/2007 | Hoffner | G06Q 40/08 705/4 |
| 2007/0067722 | A1 | 3/2007 | Ames et al. | |
| 2009/0070363 | A1 | 3/2009 | Bull et al. | |
| 2011/0071869 | A1 | 3/2011 | O'Brien et al. | |

OTHER PUBLICATIONS

Liberty Mutual eService policy service. Liberty Mutual. Retrieved from http://claims-insurance.libertymutual.com/track-claim on Mar. 6, 2010, 2 pages.

* cited by examiner

*Primary Examiner* — Thanh T Vu
(74) *Attorney, Agent, or Firm* — Howard IP Law Group, PC

(57) ABSTRACT

Systems and methods for an interactive graphical user interface for depicting the status of a claim are provided. The system includes a database for storing claim data and a server in communication with the database. The stored claim data includes a claim workflow associated the claim. The workflow defines the processing steps associated with processing the claim. The server receives a user request to check the status of the claim. The server determines status data of the claim based on stored claim data and outputs the status data to a graphical user interface for depicting a graphical representation of the status data. The graphical representation includes a timeline corresponding to the workflow of the claim and a progress bar indicative of the status of the claim.

16 Claims, 10 Drawing Sheets

SYSTEMS AND METHODS FOR STATUS DATA GRAPHICAL INTERFACE

CROSS-REFERENCE TO RELATED APPLICATIONS

This application is a continuation of copending U.S. patent application Ser. No. 14/028,187, filed Sep. 16, 2013, titled Systems and Methods for Graphical Representation of Status of an Insurance Claim, which is in turn a continuation of U.S. patent application Ser. No. 12/906,708, filed Oct. 18, 2010, titled Systems and Methods for an Interactive Graphical User Interface for Depicting Status of a Claim, now U.S. Pat. No. 8,539,370, the entire contents of each of which are herein incorporated by reference in their entireties for all purposes.

BACKGROUND OF THE INVENTION

Claim processing is complex and time-consuming. While claims are pending, customers often time contact their insurance company to check on the status of the pending claims. Such a process is inefficient and inconvenient. To solve this problem, some insurance companies send claim status updates in emails to their customers. However, there does not exist a system that provides automated real-time claim status update to a customer upon request. Accordingly, there exists a need for an intuitive and interactive graphical user interface system to allow customers to check a claim status in real-time. Additionally, there exists another need to integrate the existing data management, analysis and reporting tools and/or services of an insurance company to automate such a graphical user interface.

SUMMARY OF THE INVENTION

Systems and methods for a graphical user interface for depicting status of a claim are provided. In particular, the system includes a database and a server. The database stores claim data for a plurality of claims. The stored claim data includes a claim workflow associated with each of the plurality of claims. The server can communicate with the database to receive and store data to and from the database. The server can receive a user request to check the status of the insurance claim. In response to receiving the request, the server determines status data of the claim based on claim data stored in the database. The server can also store the determined status data in the database. Finally, the server can output the status data to a graphical user interface, which depicts a graphical representation of the status data.

In one embodiment, the server receives data for the claim workflow, which defines processing steps associated with processing the claim. The graphical representation includes a timeline, which corresponds to the claim workflow. The graphical representation also includes descriptions of processing steps associated with the workflow. To illustrate the progress or status of the claim, the graphical representation can also include a progress bar indicative of the status of the claim.

In another embodiment, the server receives a second user request to access additional claim status data. The request includes an indication to the server that the user requests to obtain additional status data associated with a particular processing step. In response to receiving the second request, the server retrieves additional claim data associated with the second request and determines the additional status data, which corresponds to the status of a plurality of substeps associated with the particular processing step. The server can output data sufficient to display, via the graphical user interface, graphical representations of additional timelines indicating the substeps associated with at least one of a plurality of processing steps. The server can also alter the timeline based on the type of coverage implicated by the claim and the nature of a loss associated with the claim. In an alternative embodiment, the second user request received by the server is a request to upload or download data to or from the server.

BRIEF DESCRIPTION OF THE FIGURES

The methods and systems may be better understood from the following illustrative description with reference to the following drawings in which.

DETAILED DESCRIPTION

To provide an overall understanding of the invention, certain illustrative embodiments will now be described, including systems and methods for providing a graphical user interface for displaying the status of an insurance claim. Examples of such graphical user interfaces and their associated functionality are described in relation to FIGS. 1-3. The architecture of the system for automating the interfaces is described in relation to FIG. 4. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1A:
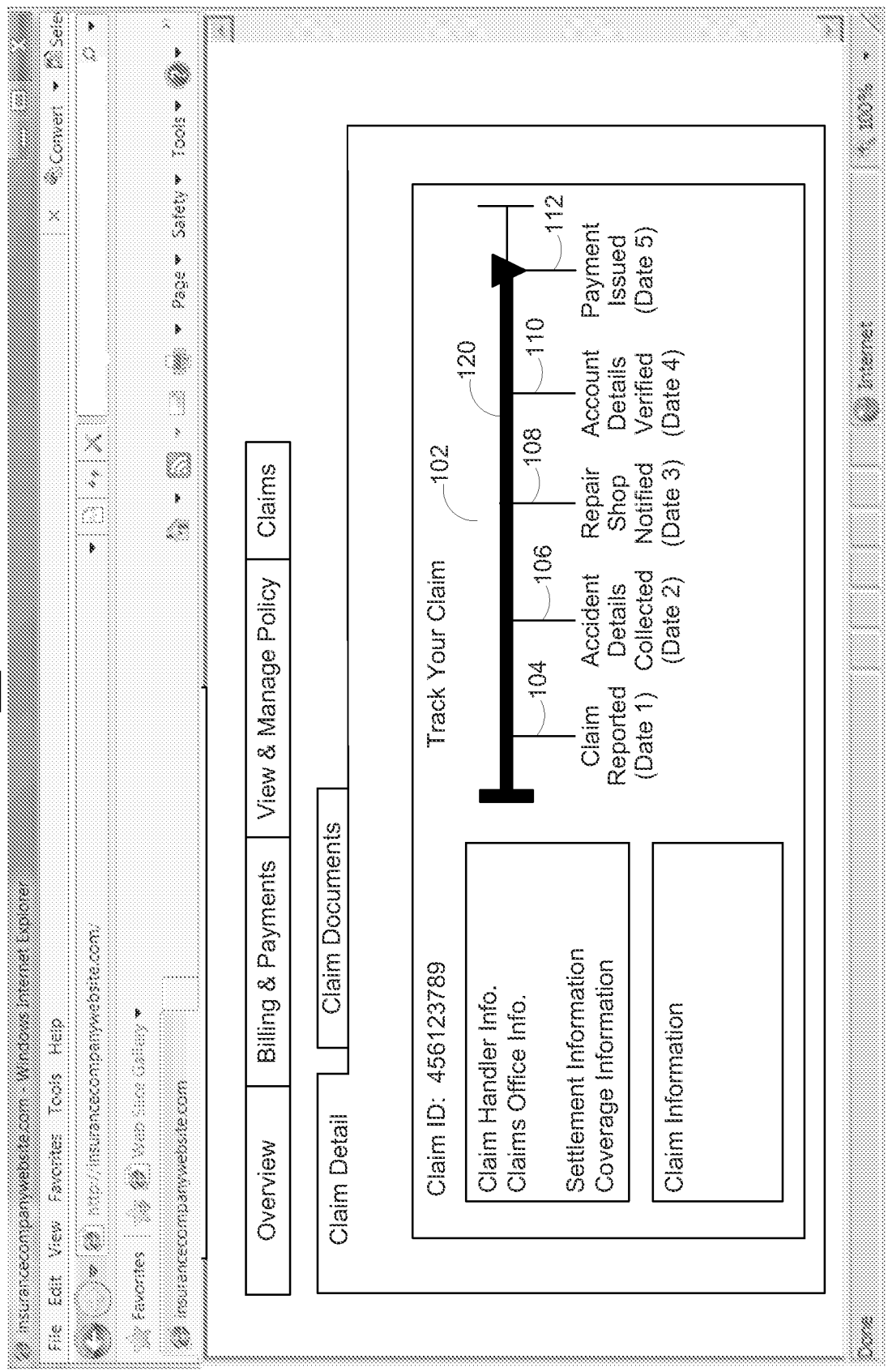
FIG. 1A is a diagram of a graphical user interface suitable for displaying status information for a first automobile insurance claim, according to an illustrative embodiment of the invention.

FIG. 1A is a diagram of a graphical user interface, in this instance, a web page 100, suitable for displaying status information for a first automobile insurance claim, according to an illustrative embodiment of the invention. As will be described further in relation to FIG. 4, the web page 100, static or dynamic, is stored in a file directory of an insurance company system. The insurance company system includes one or more servers for generating the source code for the web page 100 that can be executed by a browser. A customer can access the web page 100 by entering the URL of the web page 100 and then logging into his/her account with the insurance company. In this illustrative embodiment, a customer with collision coverage has filed an automobile insurance claim for damages occurred as a result of a car accident. After logging in, the customer can interact with various portions of the web page 100 via a user input device, such as a mouse, a trackball, a touch screen, a keyboard, and the like. In response to a user interaction with the various portions of the web page 100, the web page 100 can depict various information associated with the claim. For example, information depicted on the web page 100 includes detail about the claim, such as the customer's claim ID, information about the claim handler or adjuster (hereinafter claim handler), information about the particular claim office, information about the customer's insurance coverage, such as the coverage limit, or any other claim related information. The web page 100 can also depict a claim tracker graphic 102 (hereinafter "claim tracker" or "tracker") used to illustrate the progress or status of the claim. The claim tracker 102 includes a timeline, a set of processing steps that the insurance company must complete for the claim, and a progress bar 120. For each claim, the claim tracker 102 may include a different set of processing steps based on the nature of the loss and/or insurance coverage associated with the claim.

The claim tracker 102 begins with receipt of a notice of a loss and ends with the issuance of a payment. The progress bar 120 extends along the tracker 102 to indicate the progress or status associated with processing a claim. Along the tracker 102, there are vertical marks positioned on the tracker, each of which corresponds to a primary processing step. To fully process a claim, the insurance company completes all the steps associated with a particular claim. At completion, the progress bar 120 extends across the entire tracker 102.

In this embodiment, the claim tracker 102 includes vertical markers 104-112, which correspond to a claim reported step, an accident details collected step, a repair shop notified step, an account details verified step, and payment issued step respectively. In some embodiments, completion of a primary step requires completion of additional intermediary steps, as described in relation to FIGS. 2A and 2B. In this illustrative example, because the insurance company has completed steps corresponding to vertical marks 104-112, the progress bar 120 extends across the corresponding portions of the tracker 102. For each completed step, the web page 100 can also display the date on which the step was completed below the vertical mark that corresponds to the step. Typically, processing steps are depicted in a pre-defined order because they must be completed in a specified temporal order. For example, the step corresponding to vertical mark 104 must be completed before the step corresponding to vertical mark 106 because the claim must be reported before accident details for such a claim can be collected. Similarly, accident details typically need to be verified before a payment can be issued to the customer and/or the repair shop. However, in some instances, some processing steps can be carried out in parallel, as described in relation to FIGS. 2A and 2B. In these instances, the ordering of processing steps can be changed dynamically as the steps are completed and a new ordering of steps can be depicted to depict the actual order in which steps were completed.

For every completed step, the web page 100 can dynamically animate the completion of a step by including in its source code the corresponding function for dynamic animation. To do so, an application server queries a claim information database to determine if any processing steps were completed since the customer's last login. If a step has been completed since the last user login, the application server sends updated status data indicative of completion of the step to a web server, which then sends the updated status data to the user's web browser. Upon receiving the status data, the user's web browser calls the appropriate animation function as defined and generated by the application server, using the updated status data. Accordingly, the animation function dynamically extends the progress bar 120 to animate the completion process.

In some implementations, to depict the completion of a discrete processing step, the progress bar 120 extends from one position on the tracker 102 to the next and no-where in between. However, in other implementations, an estimation of progress associated with completion of a discrete step can be depicted by positioning the terminal end of the progress bar 120 between the two vertical marks on the tracker 102 that correspond to a previously completed step and the next discrete step. In one embodiment, to avoid over-crowding the web page 100, sub-steps or intermediary steps associated with a primary step are only displayed in response to a user request to access additional status information. Similarly, if a primary step is not discrete and is partially completed because some, but not all, of its intermediary steps have been completed, the terminal end of the progress bar 120 can also be positioned between two vertical marks on the tracker 102, as described in relation to FIGS. 2A and 2B.

In some embodiments, to simplify the illustration of status information, information about each processing step, such as the date it was completed, is not automatically displayed as part of the tracker 102. In fact, in certain embodiments, no textual description is depicted as part of the tracker 102. A customer can access or view the description and/or additional information about the processing steps by moving a cursor over the tracker 102. Alternatively, or additionally, the user can also interact with the web page 100 by clicking or selecting an active link associated with a graphic object and/or text. In another alternative embodiment, an approximation of completion is estimated and the progress can be depicted in a percent format. For example, the web page 100 can display 90% near the tracker 102 to indicate that the pending claim is near completion.

Figure 1B:
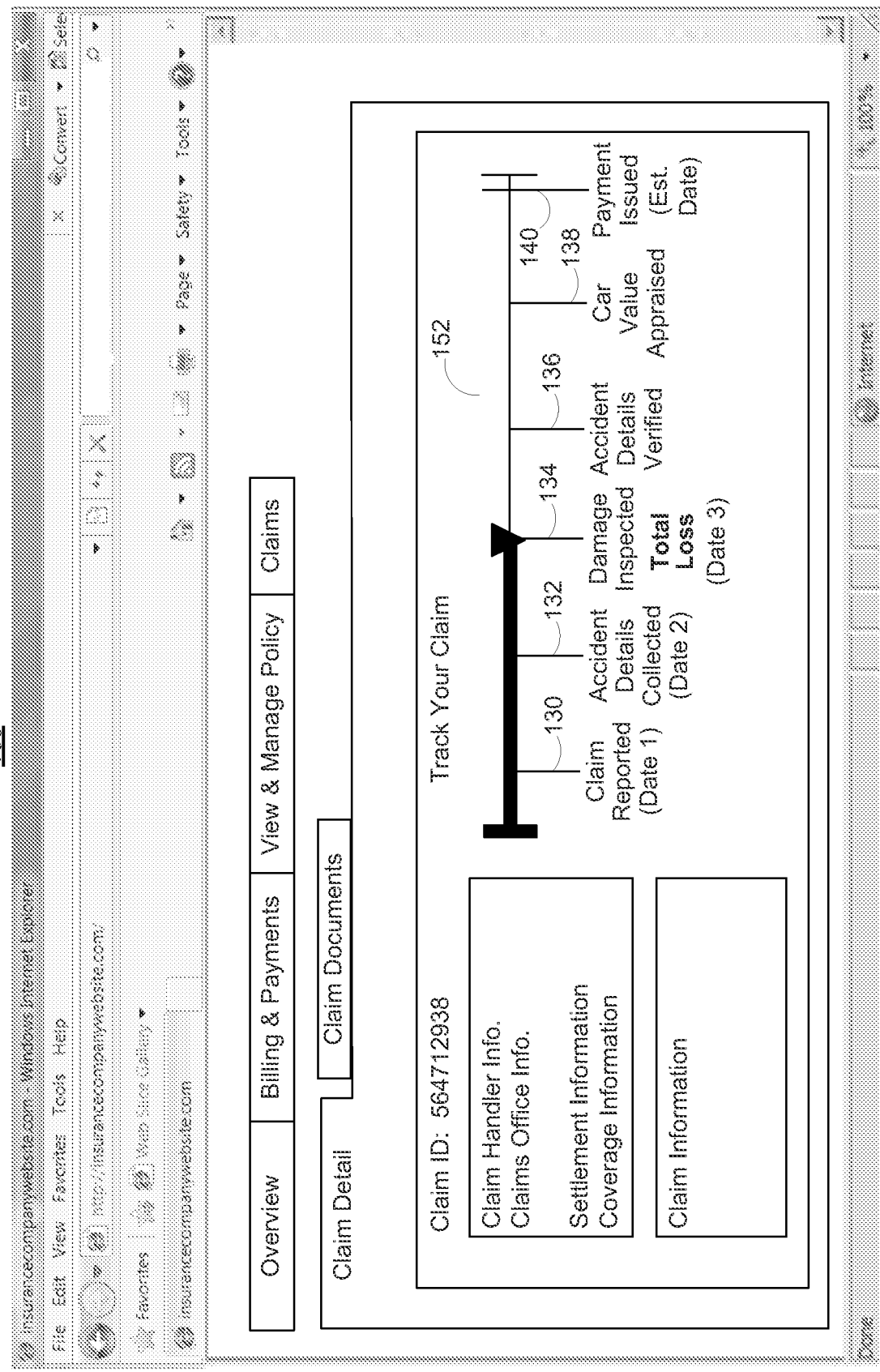
FIG. 1B is a diagram of a graphical user interface suitable for displaying status information for a second automobile insurance claim, according to an illustrative embodiment of the invention.

FIG. 1B is a diagram of a graphical user interface, in this instance, a web page 150, suitable for displaying status information of a second automobile insurance claim, according to an illustrative embodiment of the invention. Depending on the circumstances, different automobile accidents result in different losses. In this illustrative embodiment, the customer's vehicle was determined to be a total loss. In this scenario, the insurance company will offer the customer payment that substantially equals the value of the car, instead of paying for the repair of the damages. Accordingly, the processing of such a claim is different from the processing of the claim as described in relation to FIG. 1A. For example, processing a total loss claim does not require notifying a repair shop. Instead, the insurance company needs to appraise the value of the car.

In this embodiment, the web page 150 depicts a claim tracker graphic 152 (hereinafter "claim tracker" or "tracker") with vertical marks corresponding to a different set of processing steps than the set of steps as described in relation to FIG. 1A. For example, the vertical markers 130-140 correspond to a claim reported step, an accident details collected step, a damage inspected step, an accident details verified step, a car value appraised step, and payment issued step, respectively. The tracker 152 may also include an estimated date for issuing a payment. This is because for a total loss claim, the amount of time it takes to finish processing the claim may be more predictable and/or shorter than a damage claim involving repairing a car in which time is spent waiting for the repair of the car.

Figure 1C:
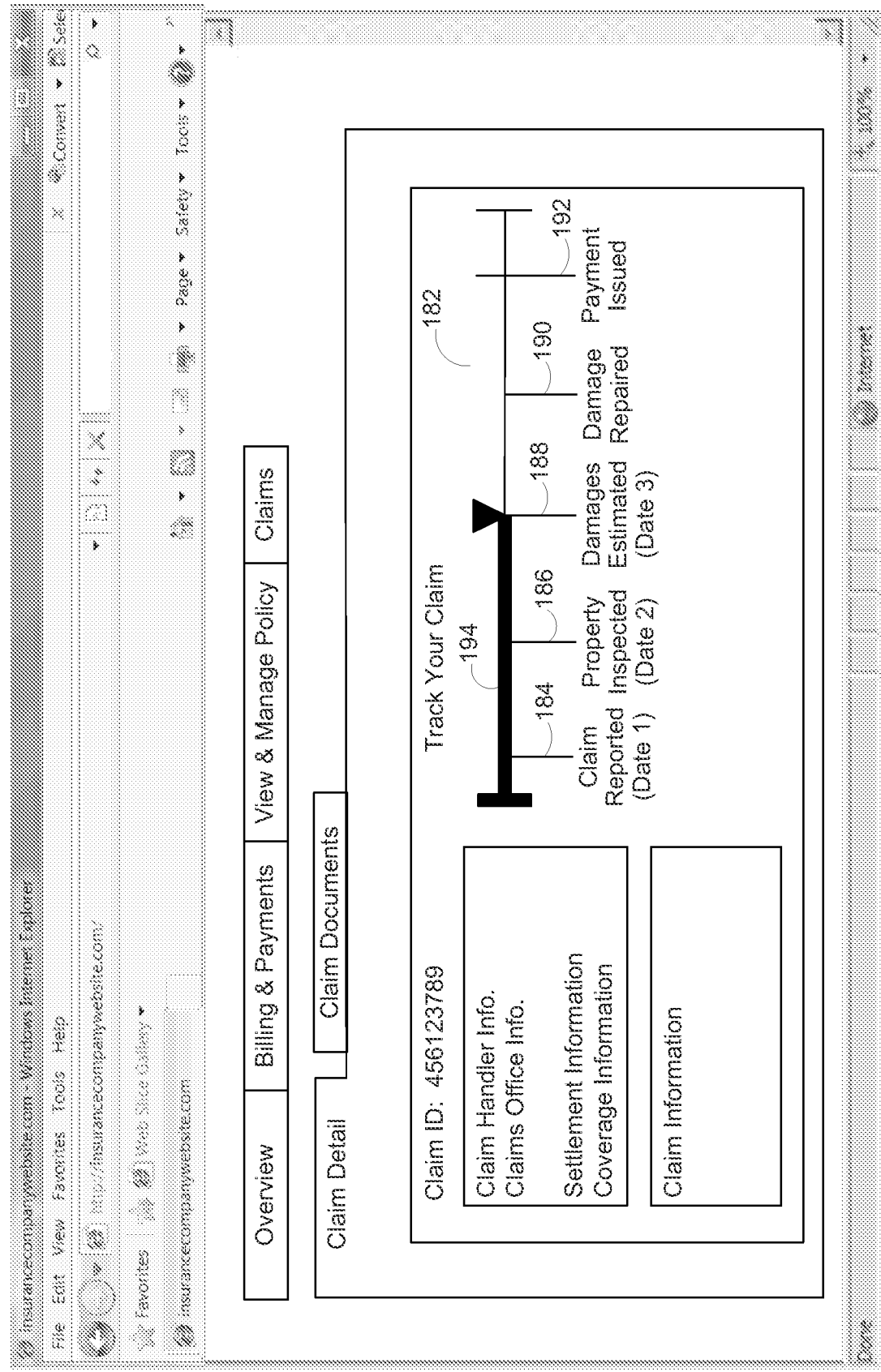
FIG. 1C is a diagram of a graphical user interface suitable for displaying status information for a home owner's insurance claim, according to an illustrative embodiment of the invention.

FIG. 1C is a diagram of a graphical user interface, in this instance, a web page 180, suitable for displaying status information for a home owner's insurance claim, according to an illustrative embodiment of the invention. As mentioned previously, the steps involved in processing a claim also depend on the particular insurance coverage for covering a loss associated with a claim. In this illustrative embodiment, a customer has filed an insurance claim for damages associated with the customer's home. In other embodiments, claims may be filed for losses associated with an office building, a retail store, a restaurant, or other property under other forms of property coverage. Damages associated with insured property may be results of a fire, burglary, weather related events, or any other covered event or incident.

In this embodiment, the web page 180 depicts a claim tracker graphic 182 (hereinafter "claim tracker" or "tracker"). The tracker 180 includes vertical marks 184-192, which correspond to a claim reported step, a property inspected step, a damages estimated step, a damage repaired step, and a payment issued step, respectively. The tracker 180 also includes a progress bar 194. The position of the terminal end of the progress bar 194 on the tracker 180 indicates the progress or status of the claim. As depicted on the web page 180, the insurance company has completed the estimation of damages. However, to finish processing the claim, the damages must be repaired and the insurance company must issue a payment, as depicted on web page 180.

Figure 2A:
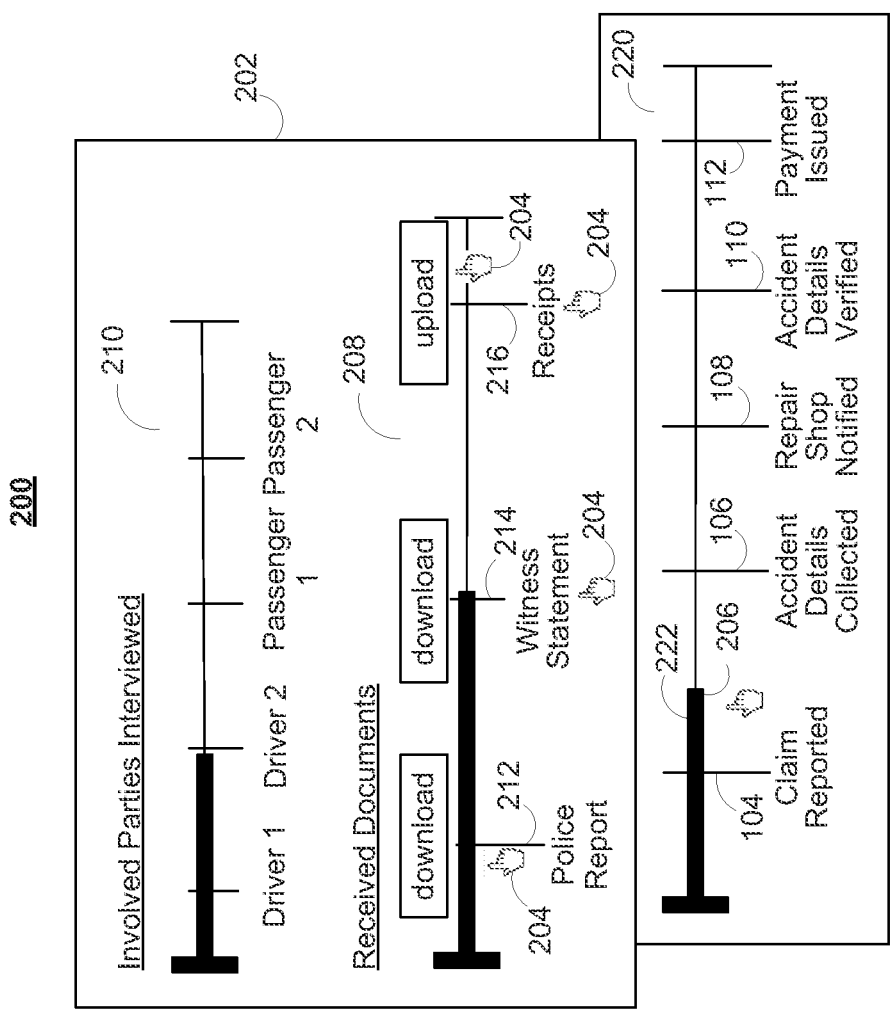
FIG. 2A is a diagram of a graphical user interface, in this case, a portion of a web page, suitable for displaying additional claim status information for an automobile insurance claim, according to an illustrative embodiment of the invention.

FIG. 2A is a diagram of an interactive graphical user interface, in this instance, a portion of a web page 200, suitable for displaying additional claim status information for an automobile insurance claim, according to an illustrative embodiment of the invention. To provide customers with the option to access additional detail about the status of a claim, a more complex and interactive graphical user interface is displayed on web page 200. The web page 200 includes claim trackers graphics 208, 210, and 220 (hereinafter "claim tracker" or "tracker"). The claim tracker 220 includes vertical marks 104-112 corresponding to the same processing steps as described in relation to FIG. 1A. The claim trackers 208 and 210 are used to depict detailed status information associated with intermediary steps that must be completed to complete a primary step. The trackers 208 and 210 are depicted in a call-out box 202, which is invoked in response to a user request for detailed status information.

The claim tracker 220 includes a progress bar 222. As depicted by the progress bar 222 on the web page 200, the accident details collected step is only partially completed because the terminal end of the progress bar 222 is positioned at position 206 between vertical marks 104 and 106. This illustrates to the customer that some steps or items, but not all, for the accident details collected step have been completed or received. In some implementations, placing the cursor 204 near the position 206 is sufficient to activate the display of additional status information, as depicted in call-out box 202.

Tracker 208 and 210 are associated with additional steps or documents to be completed or received, respectively. The graphical representations of these additional steps are depicted in two separate claim trackers because they can be carried out in parallel by the insurance company. That is, there is no temporal dependency between receiving documents associated with the tracker 208 and performing the steps associated with the tracker 210, unlike the various processing steps associated with the tracker 220.

Associated with the tracker 208 are documents that the insurance company needs to receive to complete the step for collecting accident details. Accordingly, the tracker 208 includes vertical marks 212-216, which correspond to each of such documents. As an example, the insurance company requires a copy of the police report, witness statement and receipts, such as rental car receipts, if any, from the customer. The police report may be received directly from the police and/or uploaded by a claim adjuster who received a copy of the report. Similarly, the insurance company can receive a copy of the witness statement directly from the police or from the claim handler who generates a report after interviewing the witnesses. The claim handler can upload the various documents via a graphical user interface similar to the various interfaces described in relation to FIGS. 1-3, without departing from the scope of this invention.

The tracker 208 also includes download and/or upload options to allow a customer to download a received document or upload a document to the insurance company. For example, the customer can upload a copy of receipts by clicking on the upload option 230. The upload option 230 may be displayed simultaneously when the claim tracker 208 is displayed. Alternatively, or additionally, the upload option 230 is dynamically displayed in response to a user moving the cursor 204 near the vertical mark 216 above the text associated with vertical mark 216. After the customer uploads a copy of the receipts, the terminal end of the progress bar 218 of the tracker 208 dynamically extends to vertical mark 216 or the end of the tracker 208. In addition to uploading documents, the customer can also download reports or documents already received by the insurance company to verify the accuracy of the information contained in the document.

Figure 2B:
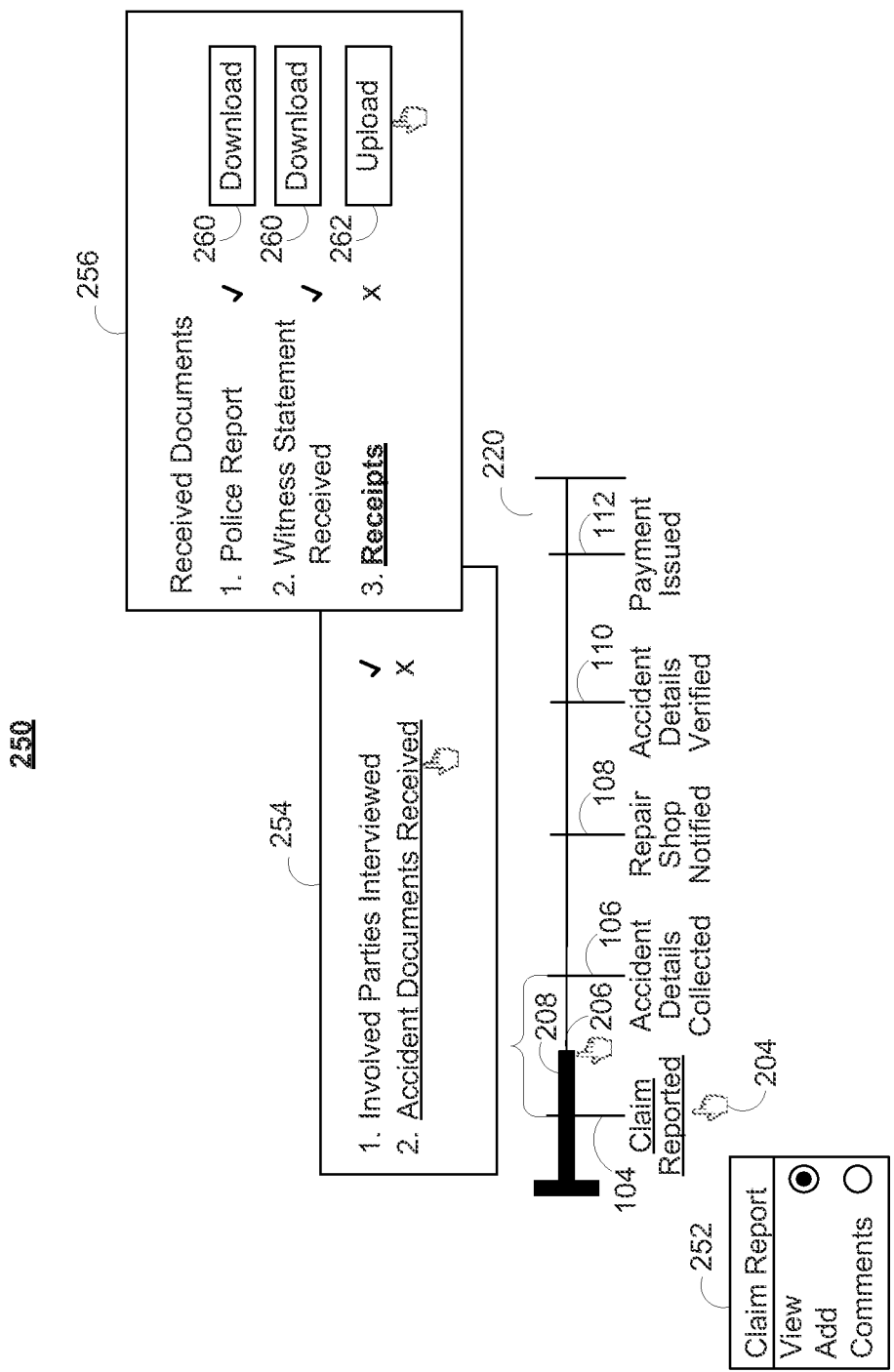
FIG. 2B is a diagram of another graphical user interface, in this case, a portion of a web page, suitable for displaying additional claim status information for an automobile insurance claim, according to an illustrative embodiment of the invention.

FIG. 2B is a diagram of another interactive graphical user interface, in this instance, a portion of a web page 250, suitable for displaying additional claim status information of an automobile insurance claim, according to an illustrative embodiment of the invention. The web page 250 includes the claim tracker 220 for depicting the claim status. In response to certain user selections or interactions, the web page 250 can depict additional status information in the form of call-out boxes, such as the call-out boxes 252, 254, and 256. For example, in response to a customer moving the cursor 204 over the progress bar 222 near the vertical mark 104 or over the description of the claim reported step, the claim report box 252 is displayed. In the claim report box 252, the customer can access a copy of the stored claim report by selecting one of the two radio buttons depicted in the box 252. For example, the customer can view the report, and/or provide comments to the report.

For an uncompleted step, such as the accident details collected step as indicated by vertical mark 106, the user can check the detailed status information associated with this step. The user can access information about its sub-steps, or intermediate steps. For example, the user can move the cursor 204 to position 208 between markers 104 and 106 to invoke the call-out box 254, which depicts the additional status information associated with the accident details collected step. The call-out box 254 depicts a listing of sub-steps that need to be completed. In this example, the sub-steps are the involved parties interviewed step and the accident documents received step. Also depicted in the box 254 is an indicator for indicating whether a sub-step has been completed. The indicator for a completed step is displayed as a check mark, whereas an uncompleted step is marked with an x. For example, because not all accident documents have been received, the status for the document received step is indicated by an x. To access detailed information about the document(s) that have not been received, the user can move the cursor over the text associated with the accident documents received sub-step to initiate the display of the call-out box 256. The text of the sub-step may also be underlined to indicate an active and/or embedded link through which the customer can access the call-out box 256 with, e.g., a click of a mouse button or touch of a touch screen.

In the call-out box 256, a list of documents needed for the completion of the documents received step are depicted, such as a police report, a copy of witness statement(s), and receipts. If a document has been received, the description of the document is marked with a check mark. If a document has not been received, the description of the document is marked with an x. A customer can download a copy of received documents via a download option 260. In the case where the customer can provide a copy of the missing documents, such as a copy of the rental car receipts, the customer can upload the copy of the receipts via an upload option 262. After receiving a document, a check mark is depicted immediately next to the description of the document.

Figure 3:
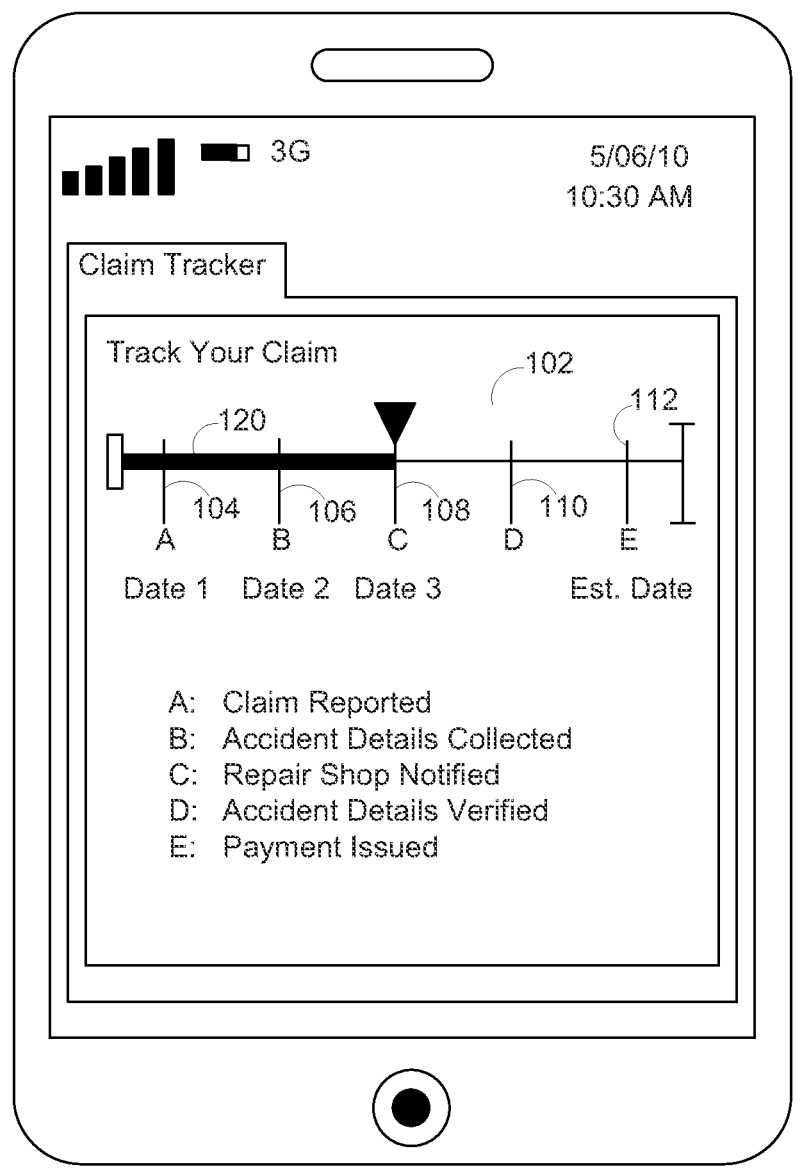
FIG. 3 is a diagram of a graphical user interface implemented on a cellular device suitable for displaying claim status information for an automobile insurance claim, according to an illustrative embodiment of the invention.

FIG. 3 is a diagram of a graphical user interface 300 implemented on a cellular device suitable for displaying claim status information associated with an automobile insurance claim, according to an illustrative embodiment of the invention. The application servers of the insurance company can provide a claim status tracker application for depicting the status of a claim to be implemented on a cellular device. The claim status application can be downloaded to a cellular device via the cell networks and/or the internet. The application can be implemented and/or executed by browsers associated with various mobile operating systems, open or closed, such as, without limitations, Symbia OS and Maemo by Nokia, IOS by Apple, RIM's BlackBerry OS by BlackBerry, Windows Phone OS by Microsoft, Linux, WebOX by Palm, Android by Google, and Baba by Samsung. The graphical user interface 300 may be substantially similar to the interfaces as described in relation to FIGS. 1-2. As an example, the interface 300 depicts the claim tracker 102, which includes the progress bar 120 for indicating the status of the claim, and vertical marks 104-112 corresponding to various processing steps. Each completed step may be associated with a date of completion, such as Date 1, Date 2, and Date 3, depicted under the vertical mark associated with the step. In some instances, an estimate of a completion date is depicted for an un-completed step. The application servers of the insurance company can estimate a date of completion based on progress data of the claim and/or historical data associated with claims having similar characteristics and/or processing steps as the pending claim.

Figure 4:
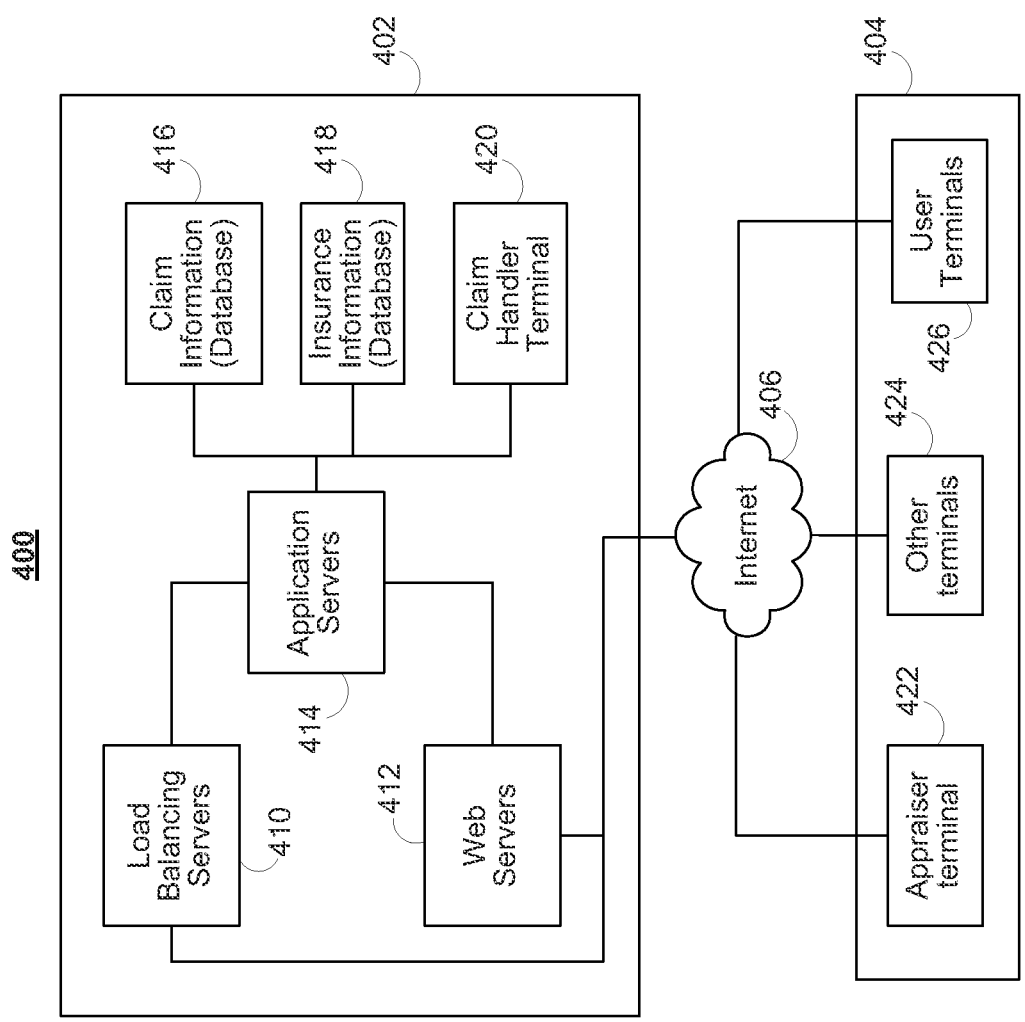
FIG. 4 is a block diagram of a web-based system for rendering the graphical user interfaces depicted in FIGS. 1-3, according to an illustrative embodiment of the invention.

FIG. 4 is a block diagram of a web-based system 400 for rendering the graphical user interfaces illustrated in FIGS. 1-3, according to an illustrative embodiment of the invention. The system 400 includes an insurance company system 402 and terminals 404. The insurance company system 402 can receive user requests sent by the terminals 404 and deliver data requested by one or more browsers implemented on the terminals 404 for depicting the graphical interfaces illustrated in FIGS. 1-3 via internet 406. The insurance company system 402 includes load balancing servers 410, web servers 412, application servers 414, a claim information database 416, an insurance information database 418, and a claim handler terminal 420. The load balancing servers 410 can balance the workload among the servers of the system 402, according to various methods well known in the art of content delivery. The web servers 412 can communicate with and provide data to the terminals 404, according to various data exchange protocols, such as http. The application servers 414 host one or more business intelligence applications, as well as an insurance company's workflow engine, which defines rules associated with business workflows. The business workflows include workflows, which define, for each claim, steps associated with processing the claim. In some embodiments, the application servers 414 include a communication engine. The claim information database 416 stores claim related data including claim status data as determined by the application servers 414 and/or provided by a claim handler via the claim handler terminal 420. The insurance information database 418 stores insurance policy data associated with each insurance policy, such as the terms and conditions outlined in the policies. The claim information database 416 and insurance information database 418 may be hosted by the same or different physical storage device or system. Collectively, databases 416 and 418 store information about processing steps associated with each claim. Databases 416 and 418 also store, for each claim, data output by the application servers 414, such as the progress or status data. In some embodiments, the databases 416 and/or 418 store templates associated with various graphical designs of a claim tracker. For example, an alternate graphical design in addition to those shown above in FIGS. 1-3, may be a pie chart in which various portions of the pie chart correspond to different processing steps.

The terminals 404 include appraiser terminals 422, user terminals 426, and other terminals 424. The terminals 404 may be personal computers, cellular devices, and any other computing devices capable of delivering to and/or receiving data from the insurance company system 402. Appraisers can use appraiser terminals 422 to provide information relevant to processing a claim, if necessary, to the insurance company system 402. User terminals 404 can send requests via a web browser or any other applications or programs to the insurance company system 402 and receive web related data from the web servers 412 of the insurance company system 402.

In operation, a user enters the URL of an insurance company's web page, such as the various web pages described in relation to FIGS. 1-3, to access insurance information. The web servers 412 receive the request and send back source code associated with the requested page, which is then loaded and executed by a web browser to render the user interface graphics and/or objects associated with the requested web page. The data delivered or sent by the web servers 412 can be in various data formats, such as XML, Json, and html. The source code may be written in various programming languages including scripting languages, such as JavaScript, Adobe Flash, and Silverlight. Examples of web browsers that are capable of rendering the graphics and/or web objects for depicting a graphical user interface include Internet Explorer, Firefox, Chrome, Safari, and any other browsers for cellular devices. If the source code contains library functions, the function libraries, such as DoJo toolkit for JavaScript, may be stored locally with the web servers 412 and/or the databases 416 and 418 of the insurance company system 402. It should be noted that although much of web based graphics rendering and/or computing is done by a web browser locally, some portions of the rendering of a graphical user interface may be done by the web servers 412 and/or any other servers of the insurance company system 402.

After providing the source code from the web servers 412 to the user's web browser, a user can interact with the web page in various ways as described above. For example, the user can request to check the claim status of his/her pending claim by moving the cursor 204 over or by clicking on a portion of a graphical user interface. The user can send the request from one of the user terminals 404 to the web servers 412 via a graphical user interface. The web servers 412 receive this request and forward it to the application servers 414 for retrieving and/or generating status data related to the user request. To do so, the application servers 414 first retrieve data about the claim from the claim information database 416, and insurance information database 418. The retrieved data may include information about the nature of claim, the terms and conditions associated with the insurance coverage, the date on which the claim was submitted, and various tasks completed by a claim handler, an appraiser, if applicable, and/or other personnel. The application servers 414 then retrieve data regarding the processing workflow associated with the claim. The workflow data defines in detail the various processing steps that the insurance company must complete to finish processing the claim. The application servers 414 then compare the stored claim data against the workflow data to determine the progress information, such as to determine the remaining processing steps to be completed. The determined progress information is forwarded to the web servers 412. Simultaneously, the determined progress information may be stored in the database 416 so that the application servers 414 can easily determine the status update data based on the changes that have occurred since the last determination.

After receiving the progress information and/or any other data necessary for rendering, e.g., a claim status tracker depicted in FIGS. 1-3, the web servers 412 convert the received data to xml, html, or Json, and deliver the data to the terminals from which the user request originated. A web browser associated with the terminal receives the data as inputs and/or function parameters for rendering the graphics according to the various functions defined in the source code. For example, if a user requests to access detailed status information by e.g., moving the cursor 204 over the claim tracker 102, an event-driven function, such as the 'hover' function in JavaScript, can implement the graphic display associated with one or more call-out windows, including the graphics for claim trackers 208 and 210 of FIG. 2A, by passing received data as parameters into the event-driven function. Similarly, a click function can be invoked in response to a user clicking on an active object on the web page to render graphics associated with the requested object and/or execute processing functionality associated therewith.

In some embodiments, the databases 416 and 418 store historical data associated with the last status check requested by a user. The data can indicate that the user requested detailed status information as part of the last status check. The next time the user logs in to request a status check, the application servers 414 can determine that the graphical user interface associated with a detailed status check should be displayed to the user based on the stored historical data. Accordingly, the application servers 414 proactively forward the appropriate detailed status data to the web servers 412 so that the user's web browser can render the graphics associated with a graphical interface for displaying detailed status information, such as the interfaces shown in FIGS. 2A and 2B. The application servers 414 can also use the stored historical data to quickly determine the change in status made since the last time that the user checked the claim status. Accordingly, the web servers 412 send the determined status update data to the user terminal so that the user's web browser can automatically animate the change in status using the update data.

Figure 5:
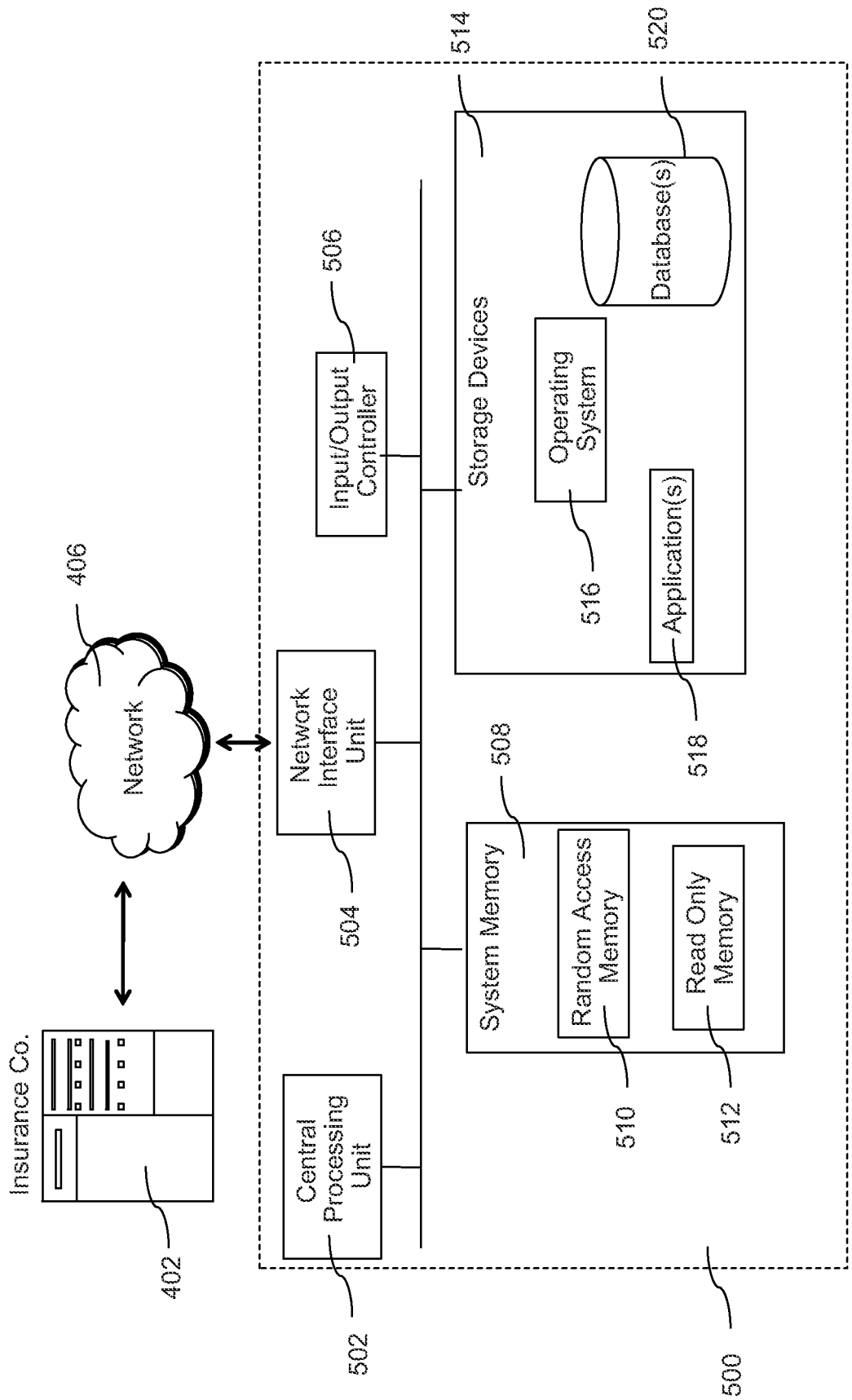
FIG. 5 is a block diagram of a server used in FIG. 4, according to an illustrative embodiment of the invention.

FIG. 5 is a block diagram of a server 500, suitable for use as one of the web servers 412 or application servers 414 described in relation to FIG. 4, according to an illustrative embodiment of the invention. The server 500 comprises at least one central processing unit (CPU) 502, system memory 508, which includes at least one random access memory (RAM) 510 and at least one read-only memory (ROM) 512, at least one network interface unit 504, an input/output controller 506, and one or more data storage devices 514. All of these latter elements are in communication with the CPU 502 to facilitate the operation of the server 500. The server 500 may be configured in many different ways. For example, the server 500 may be a conventional standalone computer or alternatively, the function of server 500 may be distributed across multiple computer systems and architectures. In the embodiment shown in FIG. 4, the server 500 is linked, via the internet 406 or local network, to other servers or systems housed by the insurance company system 402, such as the load balancing server 410.

The server 500 may be configured in a distributed architecture, wherein databases and processors are housed in separate units or locations. The server 500 may also be seen as a server located either on site near the insurance company system 402, or it may be accessed remotely by the insurance company system 402. Some such units perform primary processing functions and contain at a minimum a general controller or a processor 502 and a system memory 508. In such an embodiment, each of these units is attached via the network interface unit 504 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 502 comprises a processor, such as one or more conventional microprocessors and one or more supplementary co-processors such as math co-processors for offloading workload from the CPU 502. The CPU 502 is in communication with the network interface unit 504 and the input/output controller 506, through which the CPU 502 communicates with other devices such as other servers, user terminals, or devices. The network interface unit 504 and/or the input/output controller 506 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 502 is also in communication with the data storage device 514. The data storage device 514 may comprise an appropriate combination of magnetic, optical and/or semiconductor memory, and may include, for example, RAM, ROM, flash drive, an optical disc such as a compact disc and/or a hard disk or drive. The CPU 502 and the data storage device 514 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 502 may be connected to the data storage device 514 via the network interface unit 504.

The data storage device 514 may store, for example, (i) an operating system 516 for the server 500; (ii) one or more applications 518 (e.g., computer program code and/or a computer program product) adapted to direct the CPU 502 in accordance with the present invention, and particularly in accordance with the processes described in detail with regard to the CPU 502; and/or (iii) database(s) 520 adapted to store information that may be utilized to store information required by the program. In some embodiments, the database(s) 520 includes databases 416 and 418 for storing claim data and/or insurance data for a claim. The database(s) 520 can further include information about the customer's insurance premium, premium discounts, insurance compliance guidelines for one or more jurisdictions, policy provisions for one or more different types of insurance policies, claims information, and/or prior records of the customer's property and the like.

The operating system 516 and/or applications 518 may be stored, for example, in a compressed, an uncompiled and/or an encrypted format, and may include computer program code. The instructions of the program may be read into a main memory of the processor from a computer-readable medium other than the data storage device 514, such as from the ROM 512 or from the RAM 510. While execution of sequences of instructions in the program causes the processor 502 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing various data analysis for determining status data of a claim. The program also may include program elements such as an operating system, a database management system and "device drivers" that allow the processor to interface with computer peripheral devices (e.g., a video display, a keyboard, a computer mouse, etc.) via the input/output controller 506.

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 502 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 6:
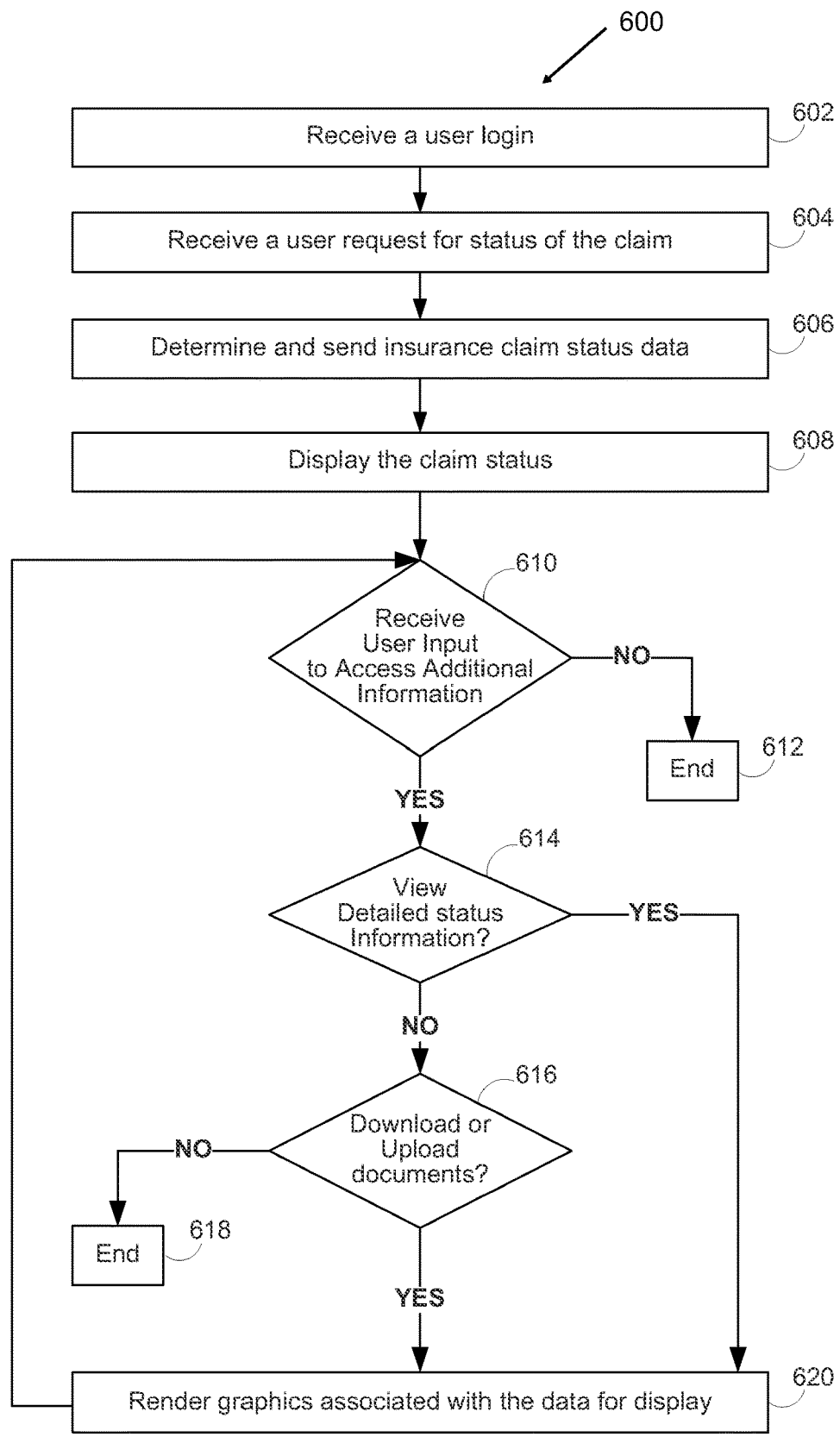
FIG. 6 is a flow chart of a method for processing a user interaction with a graphical user interface depicted in FIGS. 1-3, according to an illustrative embodiment of the invention.

FIG. 6 is a flow chart of a method 600 for generating claim status data used by a browser to render the graphical user interfaces displayed in FIGS. 1-3, according to an illustrative embodiment of the invention. The method 600 begins at step 602 by receiving a user login. After receiving the user login, the browser of the user's terminal, as described above, receives the source code for the web page from the web servers 412. At step 604, the web servers 412 receive a user request to check the status of a claim. In response to such a request, the web servers 412 forward the request to the application servers 414 for determining claim status data based on claim and insurance data stored in the claim information database 416 and the insurance information database 418, respectively. The web servers 412 convert the determined status data into formats suitable for a web browser to render the graphics as depicted in various graphical user interfaces described above, such as the graphics for the claim tracker 102 and progress bar 120. At step 608, the user's web browser renders the graphics to display the graphical user interface based on the status data received from the web servers 412.

In some instances, the web servers 412 may receive another user request associated with accessing the detailed status information. As described in relation to FIGS. 2A and 2B, the customer can move cursor 204 over the claim tracker 220 and/or progress bar 222 to request additional status information. The customer can also interact with the graphical user interfaces described above via various well known systems or methods for providing and receiving user inputs. For example, the customer can click on an active button or object displayed on the interface. Accordingly, after receiving the request by the web browser (step 610), certain functions as defined in the source code for the web page are invoked. For example, the hover function or the click function may be invoked in response to detecting a user interaction. The web browser may first determine if the user request is associated with viewing detailed status information or for downloading or upload documents at steps 614 and 616. After determining the kind of request that was received, the web browser further determines if additional data is needed from the insurance company system 402. If additional data is needed, the web browser sends a request to the web servers 412. The web servers 412 forwards the request to the application servers 414 for determining the status data associated with the request. For example, if the user request is for viewing detailed status information, the application servers 414 determine the detailed status data indicative of one or more sub-processing steps associated with an uncompleted primary step. The web browser receives the data determined by the application servers 414 and renders the graphics accordingly at step 620. Similarly, if the user has requested to download or upload a document, which is checked at step 616, the web browser may receive the corresponding status data, if needed, from the web servers 412 for displaying the graphics associated with the download and/or upload options 260 and 262. In response to receiving a download or upload request, which may be indicated by a user clicking on the associated option or object, the web browser executes the function that corresponds to the download or upload option. Accordingly, data associated with a document is received from or sent to the web server 412.

Figure 7:
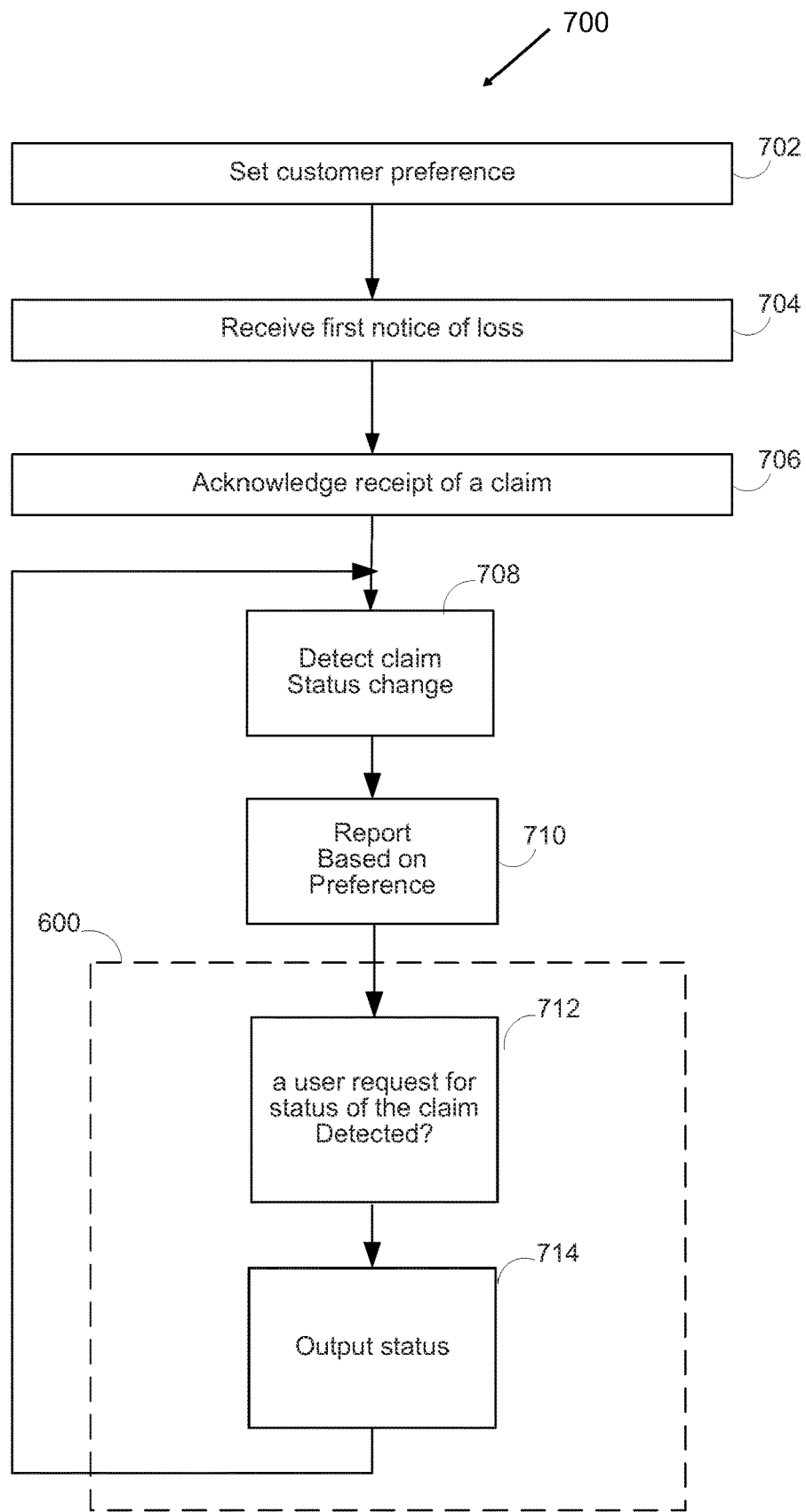
FIG. 7 is a flow chart of a method for providing claims status updates based on a user defined notification preference, according to an illustrative embodiment of the invention.

FIG. 7 is a flow chart of a method 700 for providing claims status updates based on a user defined notification preference, according to an illustrative embodiment of the invention. The method 700 begins at step 702 by allowing a customer to set his/her notification preference. Based on the user specified preference, the customer may receive notifications of claim status updates from the insurance computer system 402 via email, text, message, postal mail, notification alerts as implemented by a mobile application on a mobile or cellular phone or device, and/or a claim tracker provided by a web page, as described in relation to FIGS. 1-3. The customer can define such a preference prior to submitting a notification of a loss or after a loss has occurred. A notification preference for each customer is stored in the database 416 to allow easy retrieval of such information when the system 402 determines the user ought to be notified of updated claim information.

Once a loss has occurred, the system 402 receives a first notice of such a loss at step 704. In some embodiments, insurance personnel submit the notice on behalf of a customer. In other embodiments, the customer submits the notice. Sometime after the notice of loss is received, the system 402 receives information about the claim associated with the loss. Accordingly, at step 704, the system 402 acknowledges receipt of the claim. In some embodiments, a notification indicating that the system has received the claim is sent to the customer according to the customer's notification preference. At step 708, the system 402 detects a claim status change, e.g., the insurance company receives the police report in the case of an automobile accident. At step 710, the system 402 reports the detected status change based on the notification preference about a customer. In some embodiments, the detected status update is sent to the customer via multiple mechanisms so that the customer has multiple ways of checking the update.

If a user's preference is set such that he/she prefers to receive notification of a status update by accessing the claim tracker as described in relation to FIGS. 1-3, various steps as described in relation to FIG. 6 are executed by the system 402. The system 402 can execute various steps associated with the depiction of a claim tracker and its associated features when a user request for status of the claim is detected at 712. A user request may be received by detecting a mouse click on the claim tracker or via some other user interface input mechanism. Accordingly, the system 402 outputs the corresponding status and graphics data.

The invention may be embodied in other specific forms without departing from the spirit or essential characteristics thereof. For example, while the foregoing embodiments are described primarily in relation to web- or browser-based user interfaces, the systems and methods described above can also be implemented in accordance with other commonly known thin or thick client-server models with stand alone software installed on a customer's computing device. Therefore, the foregoing embodiments are to be considered in all respects illustrative, rather than limiting of the invention.

What is claimed is:

1. A computer system, comprising:
   a coverage database storing coverage data corresponding to a plurality of coverage policies;
   a claim database storing claim processing data for a plurality of coverage claims; and claim workflow data corresponding to a claim workflow, the claim workflow defining a series of steps associated with processing of coverage claims, and a temporal ordering of the series of steps;
   an application server configured to access coverage data in the coverage database, access the claim processing data in the claim database, and generate claim status data;
   a web server configured to:
      receive login data from a user computing device of a user to access a coverage policy web page corresponding to the user's coverage policy;
      generate web page source code for rendering of the coverage policy web page to be executed by a web browser, the coverage policy web page including a selectable option to request a status of a claim corresponding to the user's coverage policy;
      responsive to receipt of selection of the request for the status of the claim:
         forward the request for the status of the claim to the application server;
         receive from the application server claim status data;
         generate status source code for rendering a graphical depiction of the claim status data, including:
            steps source code to render a first graphical depiction of each of the series of steps of the claim workflow, including each of the series of steps which have been completed and each of the series of steps which have not been completed, each of the series of steps arranged in accordance with the temporal ordering of the series of steps; and
            dynamic animation function source code to render a second graphical depiction of a dynamic representation element distinct from the first graphical depiction of each of the series of steps of the claim workflow, the dynamic representation element comprising a unitary graphical element which dynamically varies in size to correspond to all of the series of steps of the claim workflow that have been completed;

transmit the status source code to the web browser of the user computing device to cause the web browser to render the first graphical depiction of each of the series of steps of the claim workflow and to render the second graphical depiction of the dynamic representation element dynamically adapted to correspond to all of the series of steps of the claim workflow that have been completed.

2. The computer system of claim 1, wherein the application server is further configured to query the claim database to determine whether one or more of the series of steps were completed since a last login of the user; and responsive to a determination that one or more of the series of steps were completed since the last login of the user, forward data indicative of changed claim status data to the web server to update the animation function source code; and wherein the web server is configured to send the updated animation function source code to the user computing device to cause the web browser running on the user computing device to render the dynamic representation element dynamically adapted to correspond to the changed claim status data.

3. The computer system of claim 1, wherein the web server is further configured to generate detail source code to:

define at least one of a hover function or a click function corresponding to one or more steps of the series of steps; and responsive to receipt, from the web browser on the user computing device, of invocation of the at least one of the hover function and the click function for a selected one of the series of steps, render a third graphical depiction of a series of substeps associated with the selected one of the series of steps.

4. The computer system of claim 1, wherein the web server is further configured to generate detail source code to:

define at least one of a hover function or a click function corresponding to one or more steps of the series of steps for selecting one of (i) detailed substeps corresponding to one of the series of steps, and (ii) a document download or upload corresponding to the one of the series of steps;

responsive to receipt, from the web browser of the user computing device, of an invocation of the at least one of the hover function and the click function for a selected one of the series of steps, determine whether the invocation corresponds to a request for additional information corresponding to the selected one of the series of steps or a request for the document download or upload for the selected one of the series of steps;

responsive to a determination that the invocation corresponds to the request for additional information corresponding to the selected one of the steps, render a third graphical depiction of a series of substeps associated with the selected one of the series of steps; and responsive to a determination that the invocation corresponds to the document download or upload request for the selected one of the series of steps, execute a function that corresponds to the document download or upload request.

5. The computer system of claim 4, wherein the web server is further configured to generate documents source code to render a fourth graphical depiction including a list of documents needed for completion of a documents received step of the series of steps of the claim workflow.

6. The computer system of claim 1, wherein the dynamic animation function source code causes the dynamic representation element to be displayed by the web browser as a progress bar.

7. The computer system of claim 1, wherein the user computing device comprises a mobile phone.

8. The computer system of claim 7, wherein the web browser comprises a claim status tracker application executing on the mobile phone.

9. A computer-implemented method, comprising:

storing, in a claim database stored on one or more data storage devices, (i) claim processing data for a plurality of coverage claims, and (ii) claim workflow data corresponding to a claim workflow, the claim workflow defining a series of steps associated with processing of coverage claims;

receiving, by a web server communicatively coupled to a user computing device of a user, user login data to access a coverage policy web page corresponding to a coverage policy of the user, coverage data corresponding to the coverage policy being stored in coverage database stored on a one or more data storage devices;

generating, by the web server, web page source code for rendering of the coverage policy web page to be executed by a browser, said coverage policy web page including a selectable option to request a status of a claim corresponding to the user's coverage policy;

responsive to receipt, by the web server, of a selection of the request for the status of the claim:

forwarding, by the web server, the request for the status of the claim to an application server;

generating, by the application server accessing the coverage data in the coverage database and accessing the claim processing data in the claim database, the claim status data;

receiving, by the web server from the application server, the claim status data;

generating, by the web server, status source code for rendering a graphical depiction of the claim status data, including:

steps source code for rendering a first graphical depiction of each of the series of steps of the claim workflow, including each of the series of steps which have been completed and each of the series of steps which have not been completed, each of the series of steps arranged in accordance with a temporal ordering of the series of steps; and dynamic animation function source code for rendering a second graphical depiction of a dynamic representation element distinct from the first graphical depiction of each of the series of steps of the claim workflow, the dynamic representation element comprising a unitary graphical element which dynamically varies in size to correspond to all of the series of steps of the claim workflow that have been completed;

transmitting the status source code, by the web server to the web browser of a user computing device, causing the web browser to render the first graphical depiction of each of the series of steps of the claim workflow and to render the second graphical depiction of the dynamic representation element dynamically adapted to correspond to all of the series of steps of the claim workflow that have been completed.

10. The computer-implemented method of claim 9, further comprising:

querying the claim database by the application server to determine whether one or more of the series of steps were completed since a last login of the user; and responsive to a determination that one or more of the series of steps were completed since the last login of the user, forwarding data indicative of changed claim status data to the web server to update the animation function source code; and sending, by the web server, the updated animation function source code to the user computing device to cause the web browser running on the user computing device to render the dynamic representation element dynamically adapted to correspond to the changed claim status data.

11. The computer-implemented method of claim 9, further comprising:

generating, by the web server, source code to define at least one of a hover function or a click function corresponding to one or more steps of the series of steps; and responsive to receipt, from the web browser on the user computing device, of invocation of the at least one of the hover function and the click function for a selected one of the series of steps, rendering a third graphical depiction of a series of substeps associated with the selected one of the series of steps.

12. The computer-implemented method of claim 9, further comprising:

generating, by the web server, source code to define at least one of a hover function or a click function corresponding to one or more steps of the series of steps for selecting one of (i) detailed substeps corresponding to the one of the series of steps, and (ii) a document download or upload corresponding to the one of the series of steps;

responsive to receipt, from the web browser of the user computing device, of an invocation of the at least one of the hover function and the click function for a selected one of series of steps, determining whether the invocation corresponds to a request for additional information corresponding to the selected one of the series of steps or a request for the document download or upload;

responsive to a determination that the invocation corresponds to the request for additional information corresponding to the selected one of the series of steps, rendering a third graphical depiction of a series of substeps associated with the selected one of the series of steps; and responsive to a determination that the invocation corresponds to the document download or upload request for the selected one of the series of steps, executing a function that corresponds to the document download or upload request.

13. The computer-implemented method of claim 12, further comprising generating, by the web server, source code to render a fourth graphical depiction including a list of documents needed for completion of a documents received step of the series of steps of the claim workflow.

14. The computer-implemented method of claim 9, further comprising generating, by the web server, source code to cause the dynamic representation element to be displayed by the web browser as a progress bar.

15. The computer-implemented method of claim 9, wherein the user computing device comprises a mobile phone.

16. The computer-implemented method of claim 15, wherein the web browser comprises a claim status tracker application executing on the mobile phone.

\* \* \* \* \*